US007952221B2

(12) United States Patent
Divito et al.

(10) Patent No.: US 7,952,221 B2
(45) Date of Patent: May 31, 2011

(54) ENHANCED DC ELECTRIC MAIN ENGINE START SYSTEM

(75) Inventors: Rocco Divito, Etobicoke (CA); Nicolae Morcov, Mississauga (CA); Ray McGinley, Fountain Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 863 days.

(21) Appl. No.: 11/940,090

(22) Filed: Nov. 14, 2007

(65) Prior Publication Data

US 2010/0038961 A1 Feb. 18, 2010

(51) Int. Cl.
*B60L 1/00* (2006.01)
*B60L 3/00* (2006.01)
*H02G 3/00* (2006.01)

(52) U.S. Cl. .......................................... 307/9.1; 307/80

(58) Field of Classification Search .................. 307/9.1, 307/10.6, 44, 80, 84; 290/32, 36 R
See application file for complete search history.

(56) References Cited

U.S. PATENT DOCUMENTS

| | | | | |
|---|---|---|---|---|
| 6,938,713 | B1 | 9/2005 | Tahara et al. | |
| 2004/0046517 | A1 | 3/2004 | Kim et al. | |
| 2004/0130214 | A1 | 7/2004 | Murty et al. | |
| 2006/0044846 | A1 * | 3/2006 | Hjort et al. ...................... | 363/34 |
| 2006/0168968 | A1 * | 8/2006 | Zielinski et al. ................ | 60/778 |

* cited by examiner

*Primary Examiner* — Jared J Fureman
*Assistant Examiner* — Carlos Amaya
(74) *Attorney, Agent, or Firm* — Oral Caglar, Esq.

(57) ABSTRACT

A starting system for aircraft engines employs power from multiple power sources. Each engine is started with a starter motor that is driven by the same multiple power sources which collectively provide starting power. As engine speed increases during each starting cycle a voltage boost is progressively provided by a boost converter. The starting system allows use of voltages higher than output voltage of the power sources while allowing the power sources to remain connected to a main aircraft power distribution bus.

20 Claims, 4 Drawing Sheets

ENHANCED DC ELECTRIC MAIN ENGINE START SYSTEM

BACKGROUND OF THE INVENTION

The present invention is in the field of electrical power systems and, more particularly, power conversion and distribution systems which operate in vehicles such as aircraft for purposes of performing electrical main engine starts.

In a typical aircraft, electrical power may be distributed with a 28 volt direct current (Vdc) system. In prior-art aircraft, main engine starting may be performed electrically or pneumatically. In the case of prior-art electrical starting, a DC starter-generator may be connected to a 24 Vdc battery. In the case of prior-art pneumatic starting, an air-turbine starter motor may be driven from a high pressure air source. As aircraft designs improve, these prior-art starting techniques require improvement.

One major field of design improvement is known in the aircraft industry as More Electric Aircraft (MEA). In the context of MEA design, pneumatic starting systems are considered undesirable. Consequently, electrical starting systems have become the systems of choice in MEA designs. It is also anticipated that in the near future brushless starter-generators will replace the brush type starter-generators which have been routinely used on aircraft with 28 Vdc distribution systems.

In addition to a MEA design evolution, there is a design evolution in a direction of more efficient, higher power engines. These newer engines require increased torque and speed for starting. Prior-art electrical starting systems may not provide the requisite torque and speed to efficiently start newer engines.

Another consideration is that main engines started pneumatically depend upon the availability of the aircraft auxiliary power unit (APU) as a source of high pressure air. When the APU is inoperative, a backup source of high pressure air must be located, usually in the form of a ground cart. These pneumatic ground carts are not as readily available as electric ground carts, and hence aircraft with electric start systems are considered easier to dispatch.

Various efforts have been made in the prior-art to improve electrical starting systems. In one prior-art example, two 24 Vdc batteries are connected in series to drive an electrical starter with 48 Vdc. This arrangement requires use of multiple contactors. Also electrical isolation is needed to assure that 48 Vdc is not applied to any equipment on the aircraft which may not be tolerant of 48 Vdc. This isolation is typically provided through use of a dedicated starter bus which is electrically separable from main power distribution buses of the aircraft.

Such a prior art system may be understood by referring to FIG. 1. In FIG. 1, a prior art power distribution system is designated generally by the numeral 10. The system 10 may be a starter and system for engines 12 and 14 of an aircraft (not shown). The system 10 may also be a generator system for the aircraft. The system 10 may comprise starter-generators 16 and 18, control units 20 and 22, aircraft power buses 24 and 26 and power sources or batteries 28 and 30.

The prior-art system 10 may be configured so that, in a power generation mode, direct current (DC) power may be provided to the aircraft power buses 24 and 26 at a voltage that is approximately equal to an output voltage of the batteries 28 and 30 and the starter-generators 16 and 18. In a typical aircraft, the voltage on the buses 24 and 26 may be about 28 Vdc. Various electrical devices may be connected to the buses 24 and 26. These devices are symbolically represented as blocks numbered 32 and 34. In a typical aircraft the devices 32 and 34 may be rated to operate at a 28 Vdc bus voltage.

The prior-art system 10 may also be configured to provide engine starting at a voltage higher than the 28 Vdc bus voltages. This may be accomplished by connecting both of the batteries 28 and 30 in series and employing the series connected batteries 28 and 30 to start the engines sequentially. For example the engine 12 may be started by driving the starter-generator 16 using a 48 Vdc power source. In this starter mode of operation, provision must be made to avoid energizing the aircraft power buses 24 and 26 with the 48 Vdc starting voltage.

In order to avoid applying 48 Vdc to the aircraft power buses 24 and 26, a start bus 36 may be provided in the system 10. It may be seen that various contactors and connection paths may be employed to perform engine starting through the start bus 36. The following Table 1 explains how various combinations of contactors shown in FIG. 1 and their respective switching states may provide requisite current routing of the prior-art system 10.

TABLE 1

(Prior Art)

| Contactor Number | Start Engine 12 | Start Engine 14 | Power Generation Mode |
|---|---|---|---|
| LC1 | Open | | closed |
| LC2 | | open | closed |
| SC1 | closed | open | open |
| SC2 | Open | closed | open |
| SC3 | closed | closed | open |
| BC1 | Open | open | closed |
| BC2 | | | closed |
| BC3 | Open | open | closed |

In another prior-art example an auxiliary power unit (APU) generator may be connected in series with a battery to produce a 48 Vdc starting voltage. In this arrangement the APU generator must be designed to produce the high currents needed for starting. Such a robust APU generator may not be desirable on an aircraft because of its size, weight and cost. Multiple contactors and buses are also required to temporarily interconnect the APU generator and the battery and preclude application of 48 Vdc to 28 Vdc rated equipment.

As can be seen, there is a need to provide a system of electrical power distribution and control that enhances operation of an electrical engine starter. Additionally, there is a need to reduce the number, size and weight of components used to control electrical power distribution for such enhanced operation of the engine starter.

SUMMARY OF THE INVENTION

In one aspect of the present invention an apparatus for distribution of electrical power comprises at least two electrical power sources each having an output voltage, an electric motor, at least two boost converters, a first interconnection path between a first one of the at least two electrical power sources, a first one of the at least two boost converters, a second interconnection path between a second one of the at least two electrical power sources, a second one of the at least two boost converters, a third interconnection path between at least two of the and the motor, and a controller for selectively operating the boost converters to apply power to the motor from at least two of the power sources at a voltage higher than the output voltage of either of the at least two power sources.

In another aspect of the present invention an apparatus for starting a plurality of aircraft engines comprises at least two starter-generators, at least two power sources each having a limited output voltage, a first one of the starter-generators being interconnected with a first set of at least two boost converters and at least two multi-phase inverters, a second one of the starter-generators being interconnected with a second set of at least two boost converters and at least two multi-phase inverters, a first set of selectively operable interconnection paths between the at least two power sources and the first set of boost converters and inverters, a second set of selectively operable interconnection paths between the at least two power sources and the second set of boost converters and inverters and one or more controllers for selectively operating the boost converters and inverters so that the starter generators are operated with a voltage greater than the output voltage of any one of the power sources.

In still another aspect of the present invention a method for operating an aircraft electrical system comprises the steps of supplying electrical power to a starter motor from at least two power sources connected in parallel, wherein each of the at least two power sources has an output voltage and providing a voltage boost to current flowing from both of the at least two power sources so that the motor is provided with voltage higher than the output voltage of either of the at least two power sources.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in controlling vehicle power distribution. More particularly, the present invention may provide for enhanced operation of an electrical engine starter. The present invention may be particularly useful in vehicles such as aircraft.

In contrast to prior-art power distribution and engine starting systems, which employ a dedicated starter bus, among other things, the present invention may provide for enhanced starter operation by controlling power distribution on a main power bus of an aircraft. The present invention, instead of utilizing series connected power sources, may employ a novel interconnection system, and boost converters and inverters to produce controlled power to a starter-generator in order to enhance starter system operation.

Figure 2:
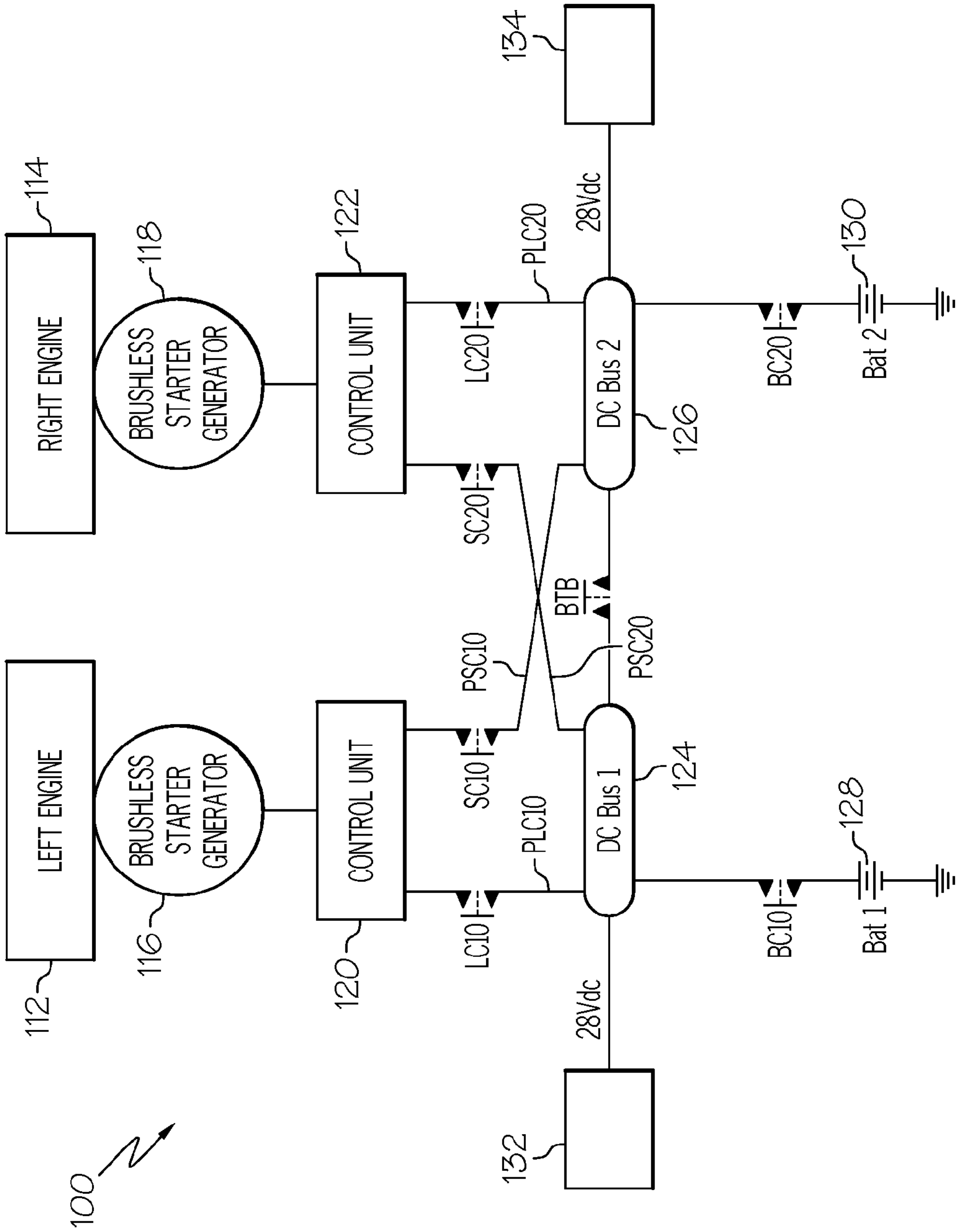
FIG. 2 is a block diagram of a power distribution control system in accordance with the present invention.

Referring now to FIG. 2, a power distribution system in accordance with the present invention is designated generally by the numeral 100. The system 100 may be a starter system for engines 112 and 114 of an aircraft (not shown). The system 100 may also be a generator system for the aircraft. The system 100 may comprise starter-generators 116 and 118, control units 120 and 122, aircraft power buses 124 and 126 and power sources such as batteries 128 and 130.

It may be noted that the system 100 does not embody a starter bus. This is because there is no need to electrically isolate the aircraft power buses 124 and 126 during startup of either of the engines 112 or 114. The batteries 128 and 130 may not be connected in series during startup. Consequently the buses 124 and 126 may remain connected to the respective batteries 128 and 130 without risk of exposing the buses 124 and 126 to a voltage higher than a battery voltage of about 24-28 Vdc. Consequently, 28 Vdc-rated electrical devices, represented symbolically as blocks 132 and 134, may be interconnected with their respective buses 124 and 126 during both engine-starting and power-generation operation of the system 100.

During engine starting, the system 100 may utilize the novel control units 120 and 122 to provide a boosted voltage to the respective starter-generators 116 and 118. The boosted voltage provided to the starter-generators 116 and 118 may not be applied to the buses 124 and 126.

The following Table 2 may explain how various combinations of contactors shown in FIG. 2 and their respective switching states may provide requisite current routing of the inventive system 100.

TABLE 2

| Contactor Number | Start Engine 112 | Start Engine 114 | Power Generation Mode |
|---|---|---|---|
| LC10 | closed | | closed |
| LC20 | | closed | closed |
| SC10 | closed | open | open |
| SC20 | open | closed | open |
| BC10 | | | closed |
| BC20 | | | closed |
| BTB0 | open | open | open |

It may be seen that the contactor LC10 along with its respective interconnecting conductors may provide an interconnection path between the battery 128 and the control unit 120. The contactor SC10 along with its interconnecting conductors may provide an interconnection path between the battery 130 and the control unit 120. Similarly, the contactor LC20 along with its respective interconnecting conductors may provide an interconnection path between the battery 130 and the control unit 122. The contactor SC20 along with its respective interconnecting conductors may provide an interconnection path between the battery 128 and the control unit 122. For purposes of illustration, these interconnection paths may be referred as interconnection paths PLC10, PSC10, PLC20 and PSC20 respectively.

Figure 3:
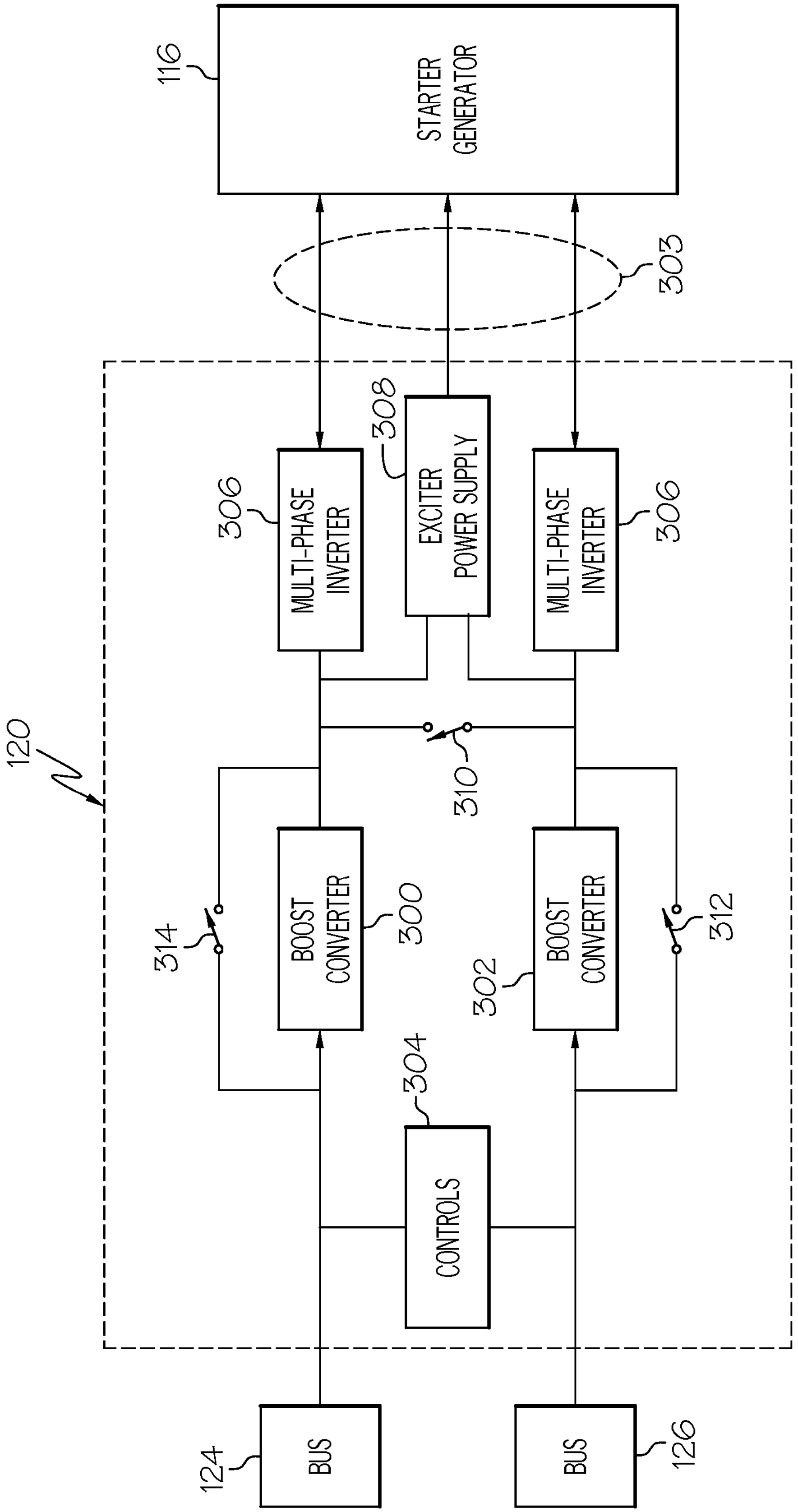
FIG. 3 is a block diagram of a control unit portion of the control system of FIG. 2.

Referring now to FIG. 3, one of the control units, for example the control unit 120 is illustrated. The control unit 120 may comprise boost converters 300 and 302, a controller 304, multi-phase inverters 306 and an exciter power supply 308. The control unit 120 may be configured to provide six-phase alternating current (AC) to the starter-generator 116 of FIG. 2. The control unit 120 may also convert six-phase AC to 28 Vdc when the starter-generator 116 is operated in a power generation mode.

The boost converter 300 may be connected with the battery 128 through the bus 124 and the interconnection path LC10 of FIG. 2. The boost converter 302 may be connected with the battery 130 through the bus 126 and the interconnection path PSC10 of FIG. 2. It can be seen that use of the two boost converters 300 and 302 connected to the two batteries 128 and 130 provides an effective parallel connection between the batteries 128 and 130. In other words, electrical energy from both of the batteries 128 and 130 may be employed to drive the starter-generator 116 through an AC interconnection path 303.

The boost converters 300 and 302 may operate in a conventional manner to provide a voltage boost to current which flows through the converters 300 and 302. As voltage is boosted, current is reduced. If a single one of the batteries, e.g. the battery 128 were to be used as a sole source of starting power for the engine 112 of FIG. 2, then a voltage boost performed by the boost converter 300 may produce an intolerable diminishment of current delivered to the starter-generator 116. Conversely, if the boost converter 300 were not used, current from the single battery 128 may be delivered to the starter-generator 116 at an intolerably low voltage.

When the batteries 128 and 130 are both used to power the control unit 120, their combined current output may be sufficient to withstand diminishment of current that may result from voltage boosting by the boost converters 300 and 302.

It may be realized that the booster converters 300 and 302 may provide voltage boosting only in a forward direction. In other words an output voltage of one of the booster converters 300 or 302 to their respective multi-phase inverters 306 may be higher than an input voltage from the aircraft power buses 124 and 126. But, the boost converters may not feed back a boosted voltage to the aircraft power buses 124 and 126 of FIG. 2. Consequently, aircraft electrical equipment represented by the blocks 132 and 134 of FIG. 2 may remain connected to their respective aircraft power buses 124 and 126 during startup of the engines 112 and 114 without risk of the equipment being exposed to overvoltage.

The controller 304 may be embodied using a conventional digital signal processor (DSP). The controller may be programmed to selectively activate the boost converters 300 and 302. The selective activation of the boost converters 300 and 302 may be performed responsively to sensed rotational speed of the starter-generator 116. This may be desirable in conditions that require voltage boosting to overcome back electromotive force (BEMF) from the starter-generator 116. BEMF may vary in magnitude as a function of rotational speed of the starter-generator 116. At low speeds BEMF may be low enough to preclude a need for voltage boosting. In such a case, the boost converters 300 and 302 may be deactivated and undiminished current may be delivered to the starter-generator 116. At higher rotational speeds, BEMF may increase and the boost converters 300 and 302 may be commanded by the controller 304 to boost voltage to overcome the increased BEMF of the starter-generator 116. In this way, an optimized current-voltage relationship may be dynamically produced for electrical power provided to the starter-generator 116. At a beginning of a startup, low speed rotation of the engine 112 may require high torque. High torque may be optimally produced with undiminished current. As rotational speed increases, torque requirements may decrease while BEMF may increase. The controller 304 may command the boost converters 300 and 302 to provide progressively increasing voltage boosting to overcome the progressively increasing BEMF.

Figure 1:
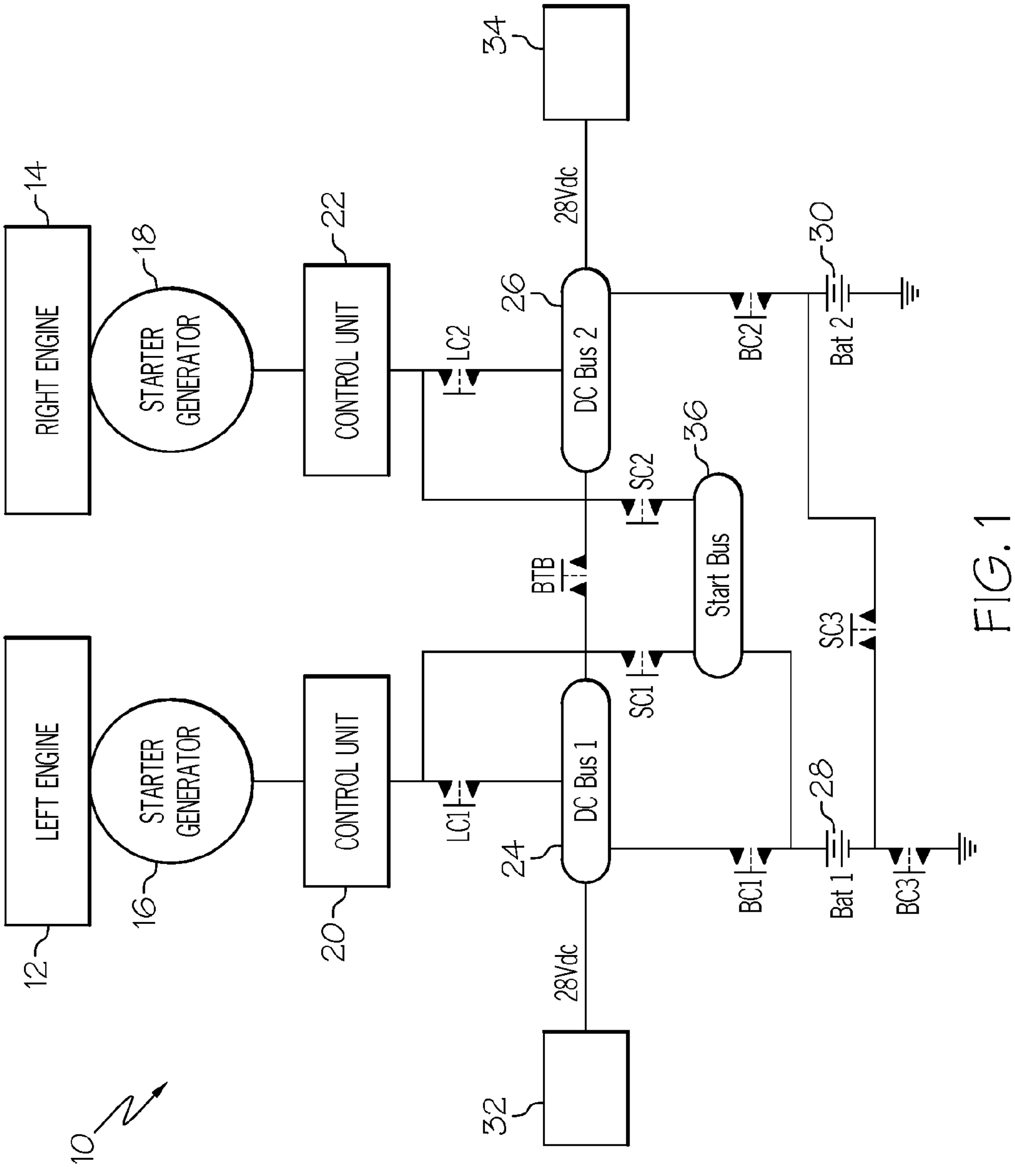
FIG. 1 (PRIOR ART)
FIG. 1 is a block diagram of a power distribution control system in accordance with the prior art.

It may be noted that the control unit 120 may comprise by-pass contactors 310, 312 and 314. These by-pass contactors may be employed to produce a circuit path through which current may be transferred directly between the starter-generator 116 and the aircraft power buses 124 and 126 of FIG. 1 after being rectified by the inverters 306. These by-pass contactors 310, 312 and 314 may be particularly useful to improve efficiency of the system 100 by offsetting adverse effects of series power transistors and inductor parasitic resistances that may be associated with the boost converters 300 and 302.

Figure 4:
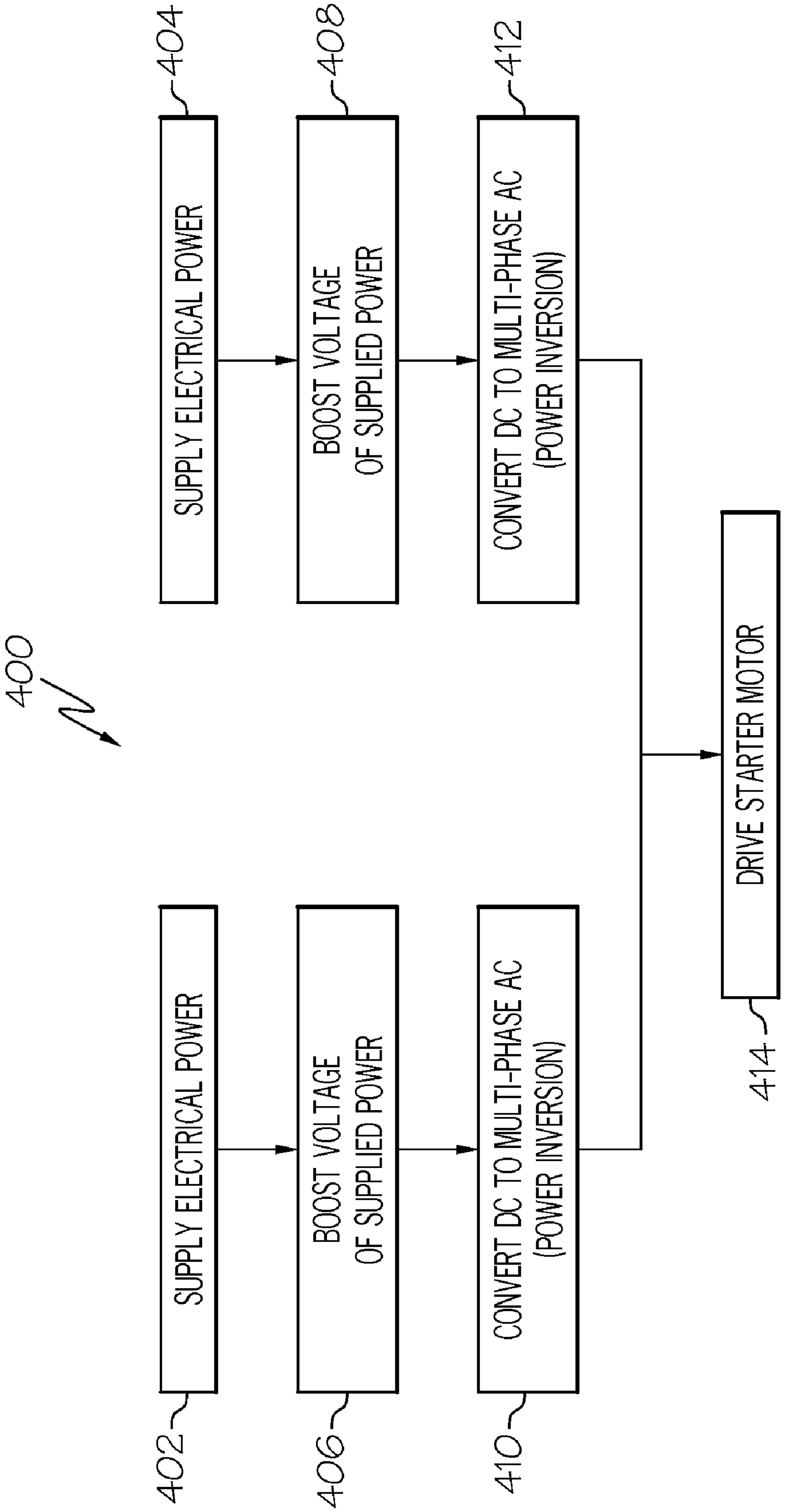
FIG. 4 is a flow chart of a method of starting an engine in accordance with the present invention.

In one embodiment of the present invention, a method is provided for controlling power distribution on a vehicle such as, for example, an aircraft. In that regard the method may be understood by referring to FIG. 4. In FIG. 4, a flow chart portrays various aspects of an inventive method 400.

In a step 402, electrical power may be supplied to a first boost converter (e.g. power from the battery 128 to the boost converter 300). In a step 404, electrical power may be supplied to a second boost converter (e.g., power from the battery 130 to the boost converter 302). In a step 406, power supplied to the first boost converter may be provided with a voltage boost (e.g. within the boost converter 300). In a step 408, power supplied to the second boost converter may be provided with a voltage boost (e.g. within the boost converter 302). In a step 410, power from the first boost converter may be supplied to a first multi-phase inverter. In a step 412 the power from the second boost converter may be supplied to a second multi-phase inverter. In a step 414, combined output of the first and second multi-phase inverters may be employed to drive a starter-generator to start an engine (e.g. the starter-generator 116 may start the engine 112).

It should be understood, of course, that the foregoing relates to exemplary embodiments of the invention and that modifications may be made without departing from the spirit and scope of the invention as set forth in the following claims.

We claim:

1. An apparatus for distribution of electrical power comprising:

at least two direct current (DC) electrical power sources each having a DC output voltage;

a first electric motor;

at least two boost converters;

a first interconnection path between a first one of the at least two DC electrical power sources and a first one of the at least two boost converters;

a second interconnection path between a second one of the at least two DC electrical power sources and a second one of the at least two boost converter;

a third interconnection path between an output of at least two of the boost converters and the motor; and a controller for selectively operating the boost converters to apply power to the motor from at least two of the power sources at a voltage higher than the output voltage of either of the at least two power sources.

2. The apparatus of claim 1 wherein:

the first electric motor is a brushless starter-generator interconnected with a power distribution bus; and the starter-generator supplies power to the power distribution bus.

3. The apparatus of claim 1 further comprising:

a second electric motor;

wherein the first electric motor provides starting power for a first engine of an aircraft with electrical energy from the at least two of the power sources; and wherein the second electric motor provides starting power for a second engine of the aircraft with electrical energy from the at least two of the power sources.

4. The apparatus of claim 1 wherein the boost converters are operated selectively to overcome back electromotive force (BEMF) of the first electric motor.

5. The apparatus of claim 1 wherein the controller selectively commands the boost converters to perform voltage boosting responsively to a sensed rotational speed of the first electric motor.

6. The apparatus of claim 1 further comprising by-pass contactors for by-passing power around the boost converters.

7. An apparatus for starting a plurality of aircraft engines comprising:

at least two starter motors;

at least two direct current (DC) power sources each having a limited DC output voltage;

a first one of the starter motors being interconnected with a first set of at least two boost converters and two inverters;

a second one of the starter motors being interconnected with a second set of at least two boost converters and two inverters;

a first set of selectively operable interconnection paths between the at least two power sources and the first set of boost converters;

a second set of selectively operable interconnection paths between the at least two power sources and the second set of boost converters; and one or more boost converter control units for selectively operating the boost converters so that the starter motors are operated with a voltage greater than the output voltage of any one of the power sources.

8. The apparatus of claim 7 wherein the starter motors comprise starter-generators which provide electrical power to the aircraft during its operation.

9. The apparatus of claim 8 wherein the starter-generators and the power sources are connected to one or more aircraft power distribution buses.

10. The apparatus of claim 7 wherein:

at least one of the power sources is connected to an aircraft power bus during engine starting and a starter bus is not present in the aircraft.

11. The apparatus of claim 7 wherein voltage on the aircraft power bus remains below a voltage rating of all rated aircraft equipment connected to the bus when voltage applied to the starter motor exceeds the output voltage of the power source.

12. A method for operating an aircraft electrical system comprising the steps of:

supplying electrical power to a starter motor from at least two power sources connected in parallel, wherein each of the at least two power sources has an output voltage; and providing a separate voltage boost to direct current (DC) flowing from each of the at least two power sources so that the motor is provided with DC voltage higher than the output voltage of either of the at least two power sources.

13. The method of claim 12 further comprising the step of operating the motor to start an engine of the aircraft.

14. The method of claim 12 further comprising the step of operating the motor as a generator to supply electrical power to the aircraft after the engine is started.

15. The method of claim 12 wherein the step of boosting voltage is performed with a solid state boost converter.

16. The method of claim 12 wherein the step of providing a voltage boost is performed for only a portion of a startup cycle.

17. The method of claim 16 wherein the step of providing a voltage boost is performed to compensate for BEMF of the motor.

18. The method of claim 16 wherein the step of providing a voltage boost is not performed during an initial portion of startup.

19. The method of claim 16 wherein the step of providing a voltage boost is performed with progressively increasing boost as a function of increasing rotational speed of the motor.

20. The method of claim 12 further comprising the steps of:

starting a first engine of an aircraft with a first one of the electric motors with electrical energy from all of the at least two power sources; and starting a second engine of the aircraft with a second one of the electric motors with electrical energy from all of the at least two power sources.

* * * * *